Figure 1:
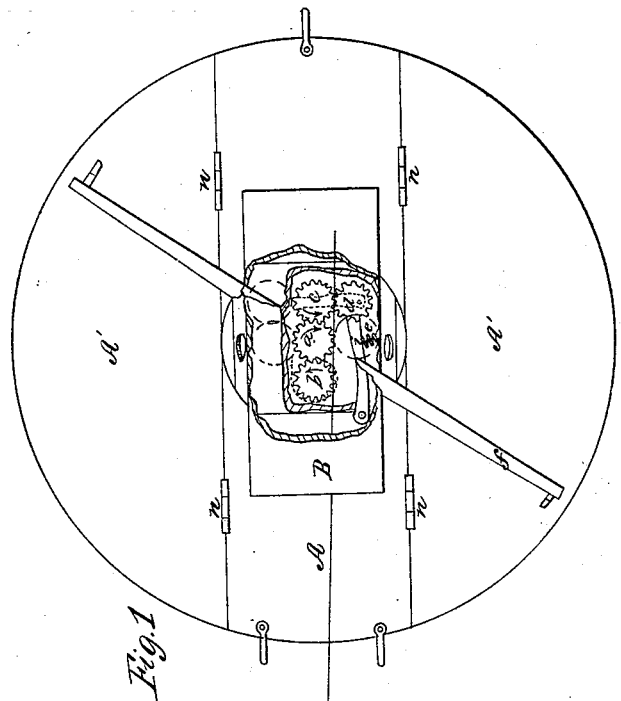

T. I. Burhyte,
Platform and Windlass.

No. 50,787.  Patented Nov. 7, 1865.

Witnesses:
Geo. Burger
P. Zell Dodge

Inventor:
Tunis I. Burhyte
By W. E. Dodge
Atty.

UNITED STATES PATENT OFFICE.

TUNIS I. BURHYTE, OF FOND DU LAC, WISCONSIN.

IMPROVED COMBINED PLATFORM AND WINDLASS.

Specification forming part of Letters Patent No. 50,787, dated November 7, 1865.

*To all whom it may concern:*

Be it known that I, TUNIS I. BURHYTE, of Fond du Lac, in the county of Fond du Lac, in the State of Wisconsin, have invented a new and useful Improvement in Portable Platform and Windlass Combined; and I do hereby declare that the following is a clear, full, and exact description thereof, reference being had to the accompanying drawings, and to the letters of reference marked thereon, similar letters indicating the same parts wherever they occur in the drawings.

The nature of my invention consists in providing a circular platform on which is mounted an adjustable windlass of novel construction, so arranged that it can be turned to draw from any direction without turning or moving the platform itself, and in hinging the platform and providing it with wheels, so that it can be transported with facility.

It further consists in an anchor of novel construction for holding the platform, and providing said anchor with an apparatus for drawing the stakes that hold it out of the ground.

To enable others skilled in the art to construct and use my improved apparatus, I will proceed to describe it.

Figure 2:
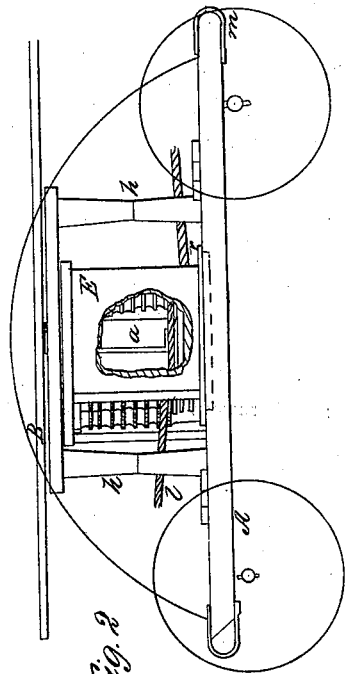
Figure 3:
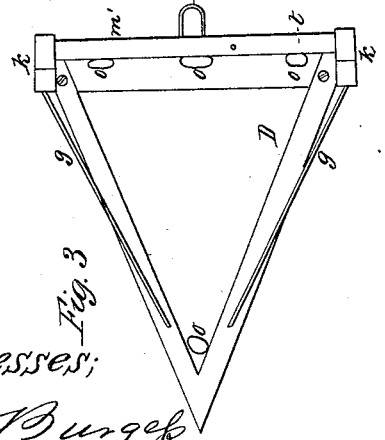
Figure 4:
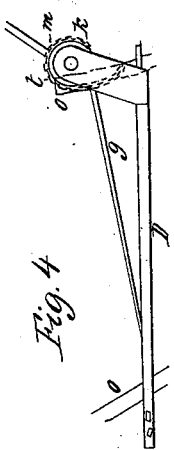

Figure 1 is a top-plan view of the platform and windlass. Fig. 2 is a side view of the same. Fig. 3 is a plan view, and Fig. 4 a side view, of the anchor and stake-pulling apparatus combined.

In many parts of the country, especially on the prairies of the West, where the land is oftentimes low and flat, it is found very difficult to use a windlass for the purposes of thrashing, ditching, &c., for the reason that the horse or other animal operating it soon becomes almost mired in the soft muddy soil. To remedy this difficulty temporary floors or platforms are laid for the animal to travel on in working the windlass. These of course have to be taken up and moved at each removal of the windlass, and as in ditching by means of a ditching plow or machine this has to be done very frequently, it necessitates a great amount of labor and consumes much time, during which all other operations have to be suspended.

To remedy these difficulties is the object of my present invention.

I first construct a circular platform consisting of three or more sections, as shown by A and A' of Fig. 1. These sections are hinged together, as shown at $n$, in such a manner that it can be spread out flat on the ground for use and the sides A' can be turned up, as shown in red in Fig. 2, when desired to transport it from place to place. Upon the central section, A, is built a strong stationary frame consisting of the posts $h$ and top B. Within this stationary frame is placed a revolving frame, E, the bottom piece, $r$, of which is made circular and is fitted into a corresponding recess in the platform A, which serves to hold it strongly in place, and at the same time permits the frame E to be turned around, as may be desired, for purposes hereinafter explained. Within this frame E are mounted four vertical rollers, $a$, $b$, $c$, and $d$, arranged as shown in Fig. 1. The central roller, $a$, has its upper journal extending up through the top of both frames E and B, and has a sweep, $f$, attached thereto, as shown in Figs. 1 and 2. On the top of each of the rollers $a$, $b$, $c$, and $d$ a cog-wheel is firmly secured, as shown in Fig. 1, the rollers being so situated that said wheels gear into one another, as there shown, whereby motion is transmitted from the roller $a$ to $b$ and $c$ on either side, and also from $c$ to $d$.

The rollers $b$, $c$, and $d$ are provided with grooves, as shown in Fig. 2, said grooves being of such size and distance apart that when the rope $l$ is wound about them it is prevented from rubbing or wearing on itself, as it usually does when wound upon a smooth roller. By this means I save immensely in the wear of the rope used.

In using the windlass the rope is passed against the roller $b$, thence around the central smooth roller, $a$, and back around $b$, two or three times around $a$ and $b$, and passes thence between the grooved rollers $c$ and $d$, where it is coiled up on the platform, as shown in Fig. 1.

By having the rollers $c$ and $d$ press tightly upon the rope it is kept from slipping, and I thus avoid the necessity of having a person to hold it, as is usually done in the ordinary windlass.

In order to compensate for the wear of the rope and be sure that the rollers $c$ and $d$ shall hold it tight, even when worn so that it is reduced in diameter, I mount the lower journal of roller $d$ in a pivoted bearing, $i$, against which a spring, $e$, presses, so as to keep it up against $c$, and thus at all times hold the rope firmly between them. If desired, a lever or wedge may be substituted for the spring.

When the platform is to be used for drawing a movable body, such as a ditching-plow, the rotating frame E is turned as shown in Fig. 2—that is to say, it is exactly reversed from what it is in Fig. 1. One end of the cable or rope, being secured to the platform at m, is passed back to a pulley attached to the object to be moved, thence around the pulley at m, back around the pulley behind, and from thence around the windlass, as previously described. After the object has been thus moved up to the platform, and it becomes necessary to move the latter forward, the frame E is turned half around again to the position shown in Fig. 1, and the rope attached to the anchor D is then applied to the windlass, one or more pulleys being used, as may be desired. When thus arranged the animal on the platform is started, and the platform, with the animal upon it, is thus drawn up to the anchor D, after which the frame E is reversed again, and the object behind again moved forward to the platform, and thus the operation is continued to any desired extent.

Another advantage of having the windlass rotate as described, is that without moving or turning the platform an object can be drawn toward it from any direction and the grooved rollers used, as described. In ditching especially it is frequently desirable to draw the machine close up into the corner of a field or close alongside of a building, tree, or other stationary object, and this can readily be done by turning the windlass so as to allow the rope to pass out around a pulley or snatch-block secured near the side of the platform.

When the platform is intended to be used with thrashing-machines I provide it with wheels, as shown in red in Fig. 2, these wheels being mounted on axles, which reach across the central section, A, the sides A' being turned up and secured, in which position it can be hauled by a team, the same as a wagon.

The anchor consists of a triangular frame, D, as shown in Fig. 1. At the rear of this frame a roller, $m'$, is mounted in the supports $k$, the latter being inclined, as shown in Fig. 2, so that when the stakes $o$ are driven into the ground to hold the anchor their upper ends are locked against the inside of said roller, which thereby prevents the stakes from being drawn over and pulled out of the ground. As these stakes are necessarily driven deeply into the ground, it is frequently difficult to get them out again. I therefore use the windlass or roller $m'$ for that purpose. I fasten a chain or rope to the stake near the ground and pass it thence around the roller $m'$, as shown in Fig. 2. By inserting a lever into a hole in the roller $m'$ and turning the latter the chain $t$ is wound around it, and thus pulls the stake up out of the ground. As more or less stakes have to be used to secure the platform in place, I also construct a small portable windlass on the same plan for pulling them. By these means a boy can draw the stakes with ease, and when not in use the small stake-puller may be set on the platform and moved with it.

Having thus fully described my invention, what I claim is—

1. A platform hinged and mounted on wheels for the purpose of moving it, substantially as shown and described.

2. The rollers $a$, $b$, $c$, and $d$, provided with cog-wheels, and having the grooves for keeping the coils of rope separate, substantially as and for the purpose set forth.

3. The reversible frame E, in combination with the platform, as shown and described.

4. Mounting one of the rollers $c$ or $d$ in an adjustable bearing, as and for the purpose set forth.

5. The anchor D, constructed as shown, and arranged to operate in combination with the movable platform, as herein set forth.

TUNIS I. BURHYTE.

Witnesses:
W. C. DODGE,
M. C. MITCHELL.